May 20, 1969 L. E. ASKE 3,445,348

CELLULAR STRUCTURE AND METHOD OF MANUFACTURE

Filed May 12, 1965 Sheet 1 of 2

INVENTOR.
LEONARD E. ASKE
BY
ATTORNEY

United States Patent Office 3,445,348
Patented May 20, 1969

3,445,348
CELLULAR STRUCTURE AND METHOD OF MANUFACTURE
Leonard E. Aske, Minneapolis, Minn., assignor to Honeywell Inc., Minneapolis, Minn., a corporation of Delaware
Filed May 12, 1965, Ser. No. 455,180
Int. Cl. C23b 7/08, 7/00
U.S. Cl. 204—9      4 Claims

ABSTRACT OF THE DISCLOSURE

In the present invention a cellular structure is made by an electroforming process as follows: form a waffle iron shape wax mold from a master; coat the mold with suitable material for electrode conductivity; electroplate a metallic material on the conductive wax mold; fill the depressions of the metallic coating with wax to form a continuous surface area of wax and metallic material; conductivate the localized wax surface; electroplate a second metallic material on the first metallic material and the conductive wax surface to form a solid sheet member; melt the wax from the electroformed cellular structure.

---

In the art of designing equipment for use in satellites and generally in vessels to be put into orbits which circle or paths which escape from the earth, it has been estimated that the cost of putting each pound of mass into orbit is in the neighborhood of $50,000. Thus, the most extreme measures of weight reduction are justified, and great use in made of substitute metals and cellular construction.

Metallic and non-metallic honeycomb material is well-known and has been used in many applications. The present invention has for its general object to extend the use of cellular construction further than has been possible heretofore, so that it becomes practical for such applications as instrument panels and housings, even where the total thickness of the completed structure is not more than 1/16 inch. For reasons of mechanical strength and rigidity a minimum thickness of metal in such applications is unavoidable: it is of course known that the same strength and rigidity can be obtained, in a cellular structure, with considerably less weight. Conventional methods of honeycomb construction are not suitable for making such thin sections of material, however, and consequently, the unavoidable use of solid metal for panels, housings, and so on has carried a considerable weight penalty.

My invention has for its object to provide a new cellular material and a new method for producing that material. Various other objects, advantages and features of novelty not individually enumerated above which characterize my invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which I have illustrated and described certain preferred embodiments of my invention.

Figure 1:
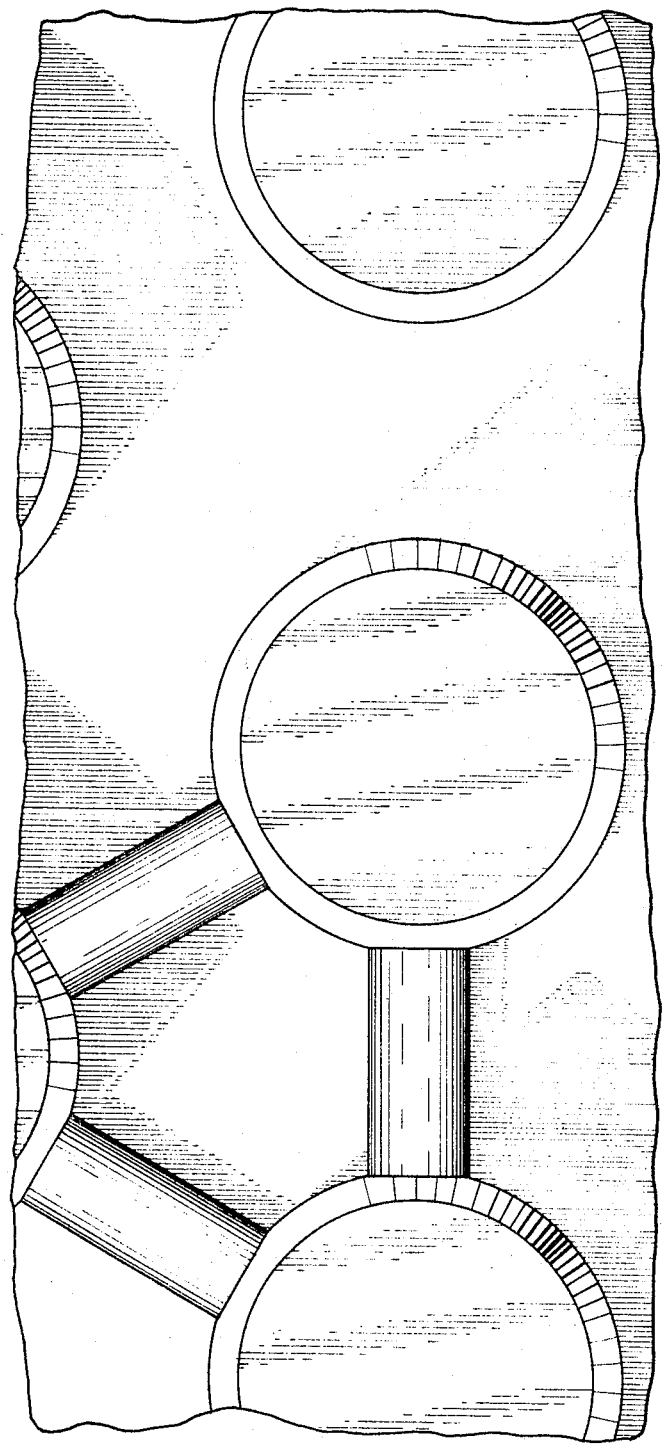
Figure 2:
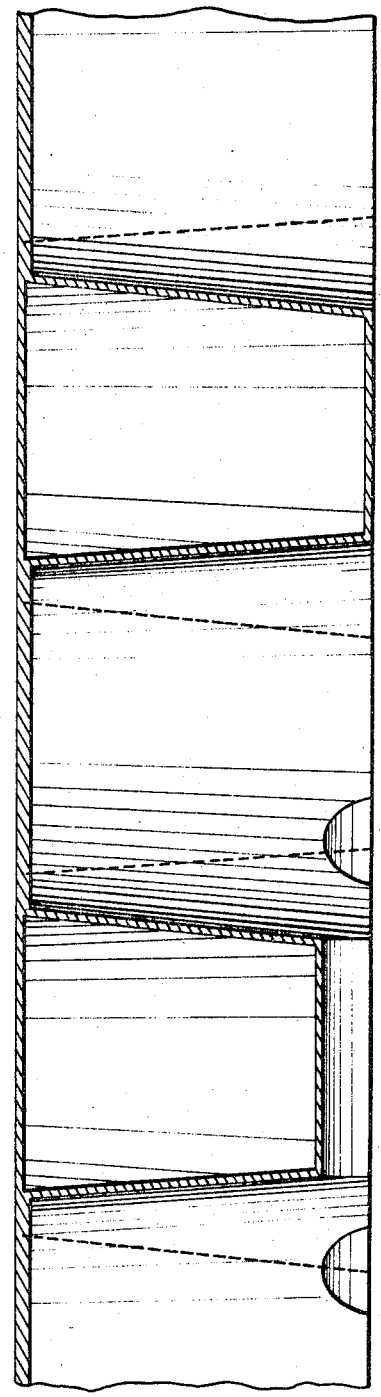
Figure 3:
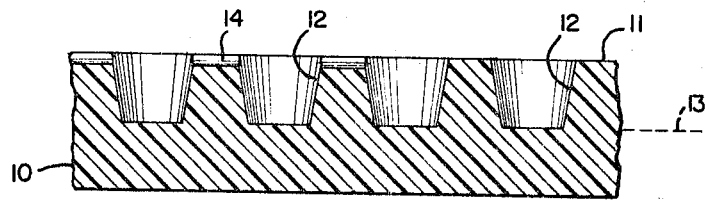

In the drawings, FIGURE 1 is highly enlarged fragmentary plan view of material embodying one form of my invention, FIGURE 2 is a highly enlarged sectional view of a second embodiment, and FIGURES 3-8 are enlarged sectional views illustrating steps in the manufacture of my material.

The nature of the cellular material which I have invented will be best made clear by a careful recitation of the method by which it is manufactured. As a first step there is prepared the negative mold 10 shown in fragmentary section in FIGURE 3, which is of aluminum, silicone rubber or some other suitable material. Mold 10 has a flat surface 11 into which are formed an array of slightly conical indentations 12: the bottoms of these indentations define a second surface indicated by the broken line 13, which is everywhere equidistant from the first surface. If desirable for greater rigidity in the structure being manufactured, small grooves 14 of generally semi-circular section may be cut into surface 10 interconnecting the indentations 12 in an isometric network.

Figure 4:
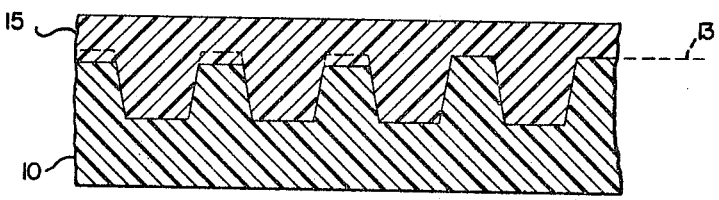
Figure 5:
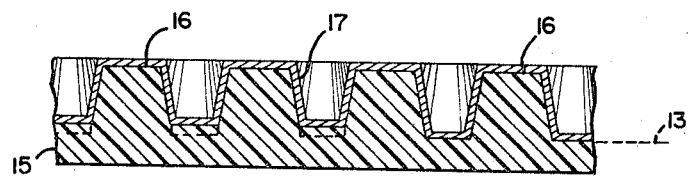

The next stage in manufacture is shown in FIGURE 4: a positive mold 15 is produced by filling mold 10 with a suitable wax or other appropriate wastable material which does not adhere to mold 10, and allowing the material to set, after which the two molds are separated, and mold 15 is inverted to appear as shown in FIGURE 5.

Mold 15 comprises an array of conical projections 16 extending from surface 13. The entire upper surface of this mold is now sensitized with a suitable electrically conducting material, the mold is placed in a plating bath, and nickel or copper is electrolytically deposited on the sensitized surface to a desired thickness, as shown at 17. Some idea of the dimensions involved may be informative at this point: the height of the conical projections is about .050 inch and their center-to-center spacing is about .093 inch, in one practical embodiment of the invention. A plating of nickel one to two mils in thickness is sufficient to give the desired characteristics in the completed structure.

At this point, it may be sufficient to melt or dissolve out mold 15: an enlarged fragmentary plan view of the material in this stage of manufacture is shown in FIGURE 1. If this is done, 1-mil or 2-mil sheets of material such as stainless steel should be secured to one or both surfaces of the resulting pimpled nickel sheet, by any suitable process such as cementing, brazing, soldering, or welding while the layers are held in close contact. This results in a thin sheet of cellular material which is plane on one or both sides and which may appear as shown in enlarged section in FIGURE 2. I prefer however to proceed further as will now be described, to produce a monolithic material which has one plane outer surface, for exposure, and one dimpled inner surface.

Figure 6:
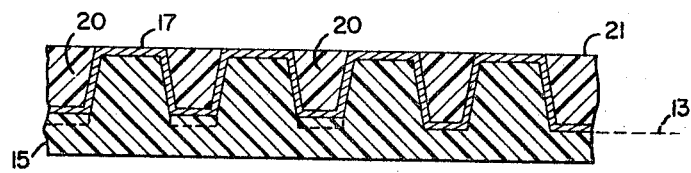

The next stage of my preferred process is shown in FIGURE 6: further mold material 20 like that used in mold 15 is applied to the upper plated surface after suitable rinsing, until all of the interstices are filled, but none of the flat tops of the projections are covered. After again sensitizing the upper mold surface 21 the mold is returned to the plating bath and a further 5–10 mil layer or nickel is deposited thereon, as is shown in FIGURE 7: the newly deposited nickel becomes essentially homogeneous with the exposed metal at the tops of the conical projections, to tie them together rigidly as a one piece metal construction.

Figure 7:
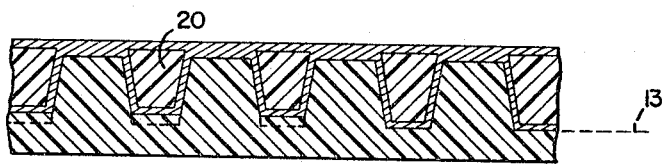
Figure 8:
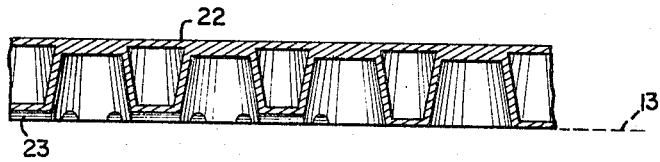

Although it appears in FIGURE 7 that there are masses of trapped mold material 20, a consideration of the structure in three dimensions will make it evident that these masses are in fact interconnected laterally to form a continuous body. The assembly of FIGURE 7 may be immersed in a solvent for the mold material, or may be turned on edge and heated to melt the material and allow it to run out by gravity. The resultant cellular structure is shown in FIGURE 8. One surface 22 of this material is smooth; the other is dimpled and may be provided with a network of reinforcing ribs 23.

If occasion arises for a cellular material of even greater rigidity or one having both of its surfaces smooth, the procedure described above may be repeated to deposit a second flat layer opposite the first one. Although this gives more rigidity, it also adds weight, and further requires that the last deposited surface be provided with an array of pin pricks or similar perforations so that the newly added mold material may be extracted after the deposition is completed.

From the foregoing it will be evident that I have invented cellular material, capable of being supplied in relatively thin sheets, which is of satisfactory rigidity and which has a high strength to weight ratio partly because of its structure and partly because of material from which it is made since nickel is a very strong material. The increased cost of nickel as a material is compensated for by the very thin sections of this metal which are used. It will also be evident that a very considerable part of my invention resides in the method devised for manufacturing the material: for the dimensions and material involved, punch press procedures for example are out of the question. Moreover, my method results in material which is free from the mechanical stresses produced by press operations and the thermostresses resulting from welding or brazing.

Numerous objects and advantages of my invention have been set forth in the foregoing description, together with details of the structure and function of the invention, and the novel features thereof are pointed out in the appended claims. The disclosure, however, is illustrative only, and I may make changes in detail, especially in matters of shape, size and arrangements of parts, within the principle of the invention, to the full extent indicated by the broad general meaning of the terms in which the appended claims are expressed.

I claim as my invention:

1. The method of forming cellular structure which comprises the steps of first forming by deposition of metal a spacing member comprising a laminar portion lying in a first surface and an array of hollow projections extending from the same side thereof and integral therewith, portions of said projections remote from said laminar portion defining a second surface, and then forming by deposition of metal an imperforate skin member homogeneous with said projections and coextensive with said second surface, the thicknesses of said members being small compared with the height of said projections.

2. The method of constructing a laminated material which comprises the steps of first preparing a negative mold made up of an array of mutually spaced depressions of substantially equal depth below a common surface, then forming in said negative mold a positive, wastable mold comprising a first continuous portion and a second discontinuous portion connected by an array of mutually spaced elements, said portions lying in a pair of equidistant surfaces, then depositing metal upon said wastable mold until an imperforate layer has been built up to comprise a member having a desired thickness which is small compared to the distance between said equidistant surfaces, then filling the space between said portions with a wastable material, then depositing further metal upon said material and upon the portions of said layer making up said discontinuous portions until a further layer has been built up having a desired thickness which is small compared to the distance between said equidistant surface, and then wasting said wastable material.

3. The method of reinforcing a thin metal member having a plurality of mutually spaced projections of equal height which comprises the steps of first applying to said member a layer of wastable material of which the thickness is equal to said height, then depositing further metal upon said layer and upon the tops of said projections to form an imperforate layer homogeneous with said member and of a desired thickness which is small compared with said height, and then wasting said wastable material.

4. The method of reinforcing a thin metal member having a plurality of mutually spaced hollow projections of equal height which comprises the steps of first applying to said member a layer of wastable material of which the thickness is equal to said height, then depositing further metal upon said layer and upon the tops of said projections to form an imperforate layer homogeneous with said member and of a deseired thickness which is small compared with said height, and then wasting said wastable material.

References Cited

UNITED STATES PATENTS

| 3,196,089 | 7/1965 | Stoycos | 204—281 |
| 1,986,338 | 1/1935 | Harrison | 204—9 |

FOREIGN PATENTS

| 27,477 | 1903 | Great Britain. |
| 135,800 | 12/1919 | Great Britain. |
| 797,678 | 7/1958 | Great Britain. |

JOHN H. MACK, *Primary Examiner.*

T. TUFARIELLO, *Assistant Examiner.*

U.S. Cl. X.R.

164—35; 204—11